UNITED STATES PATENT OFFICE.

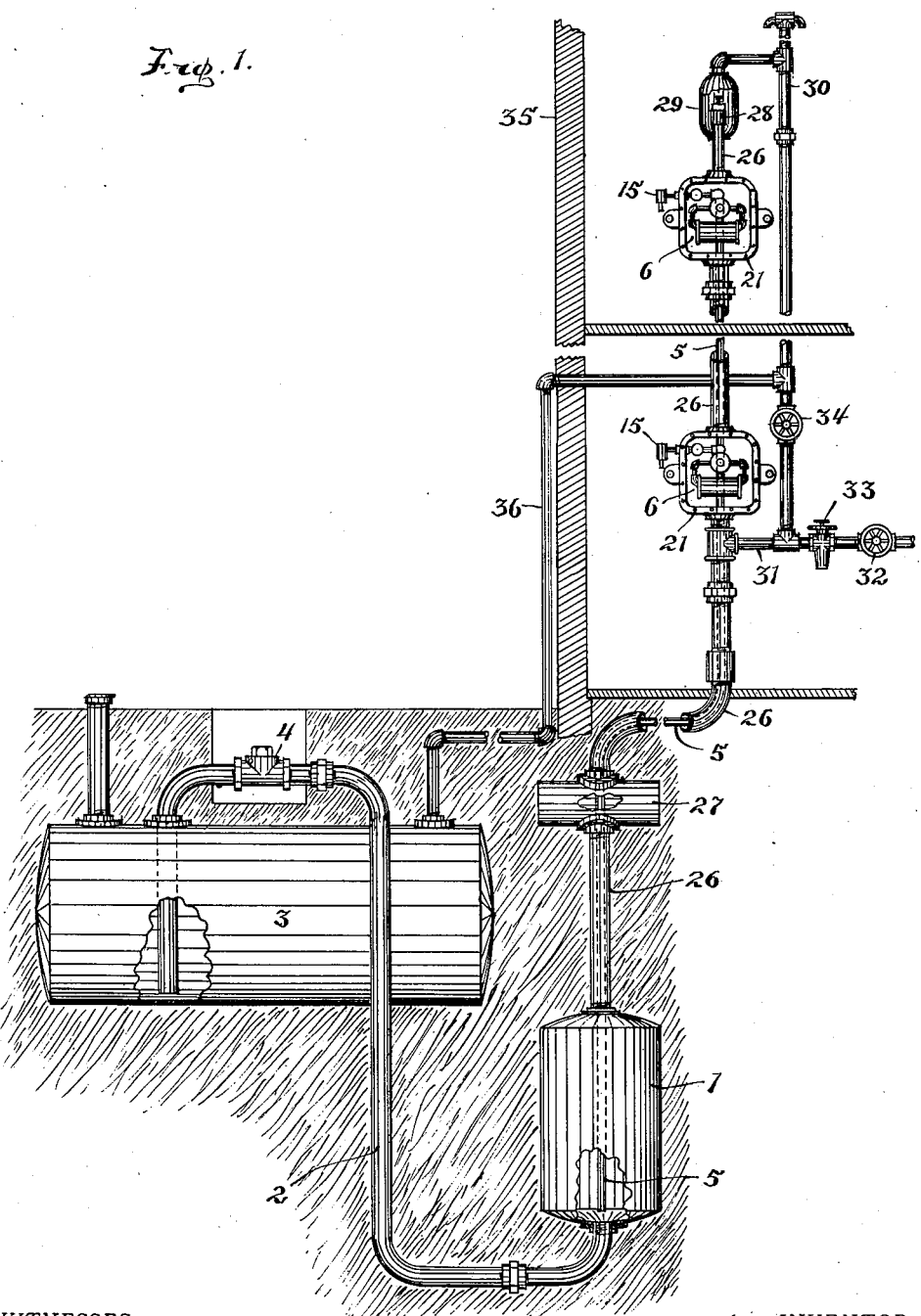

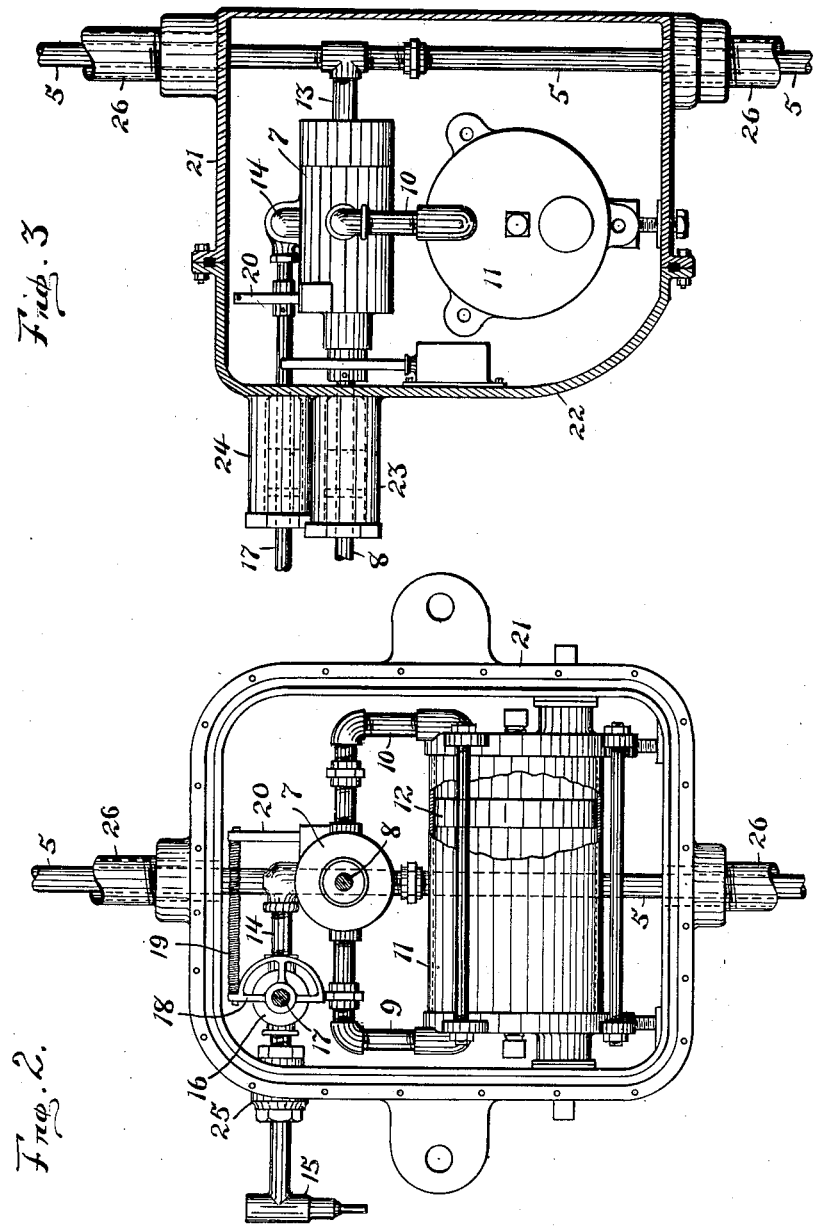

AUGUSTUS BOWSER, OF FORT WAYNE, INDIANA.

LIQUID-DISTRIBUTING APPARATUS.

1,086,990. Specification of Letters Patent. Patented Feb. 10, 1914.

Application filed April 18, 1912. Serial No. 691,654.

*To all whom it may concern:*

Be it known that I, AUGUSTUS BOWSER, a citizen of the United States of America, and resident of Fort Wayne, in the county of Allen and State of Indiana, have invented certain new and useful Improvements in Liquid - Distributing Apparatus, of which the following is a specification.

This invention relates to improvements in liquid distributing apparatus in which liquid is forced from a supply tank through distributing apparatus by means of air under pressure introduced into the supply tank.

The object of the improvement is to afford apparatus for distributing liquid under pressure in which will be provided means that will insure the return to the supply tank of any liquid that may leak through the distributing pipe, and also to afford a construction by which the pressure that drives the liquid will become released in case the apparatus becomes broken.

The object of the improvement is accomplished by the construction illustrated in the accompanying drawings in which:

Figure 1 is an elevation showing in general arrangement the various parts of the apparatus with their connections; Fig. 2 is a front elevation of one of the discharge heads in its case, the front of the latter being removed; and Fig. 3 is a side view of the discharge head, the case being shown in vertical section.

Similar numerals of reference indicate corresponding parts throughout the several views and referring now to the same:—

1 is a supply tank which is fed through a siphon 2 from a storage tank 3, the siphon having a check valve 4 which is adapted to prevent the back flow of liquid through the siphon when air is applied under pressure to the tank 1. The storage tank 3 is located at a higher level than the supply tank 1 so that the latter will become filled with liquid from the former tank through the siphon when the pressure of air in the supply tank is released.

A distributing pipe 5 extends into the supply tank through the top thereof to a point therein near the bottom, and extends upwardly to a point higher than either of the tanks and has connected therewith one or more discharge heads 6.

The discharge apparatus may be of any suitable construction, but I have shown in the drawings, as an example, discharge apparatus similar in character to that disclosed in my application, Serial Number 546,904, filed March 2, 1910. In this form is employed a four-way valve which is operated by its stem 8. The valve has respective connections 9 and 10 with the corresponding ends of a cylinder 11 in which is arranged a loose plunger 12. The valve has also a connection 13 with the distributing pipe 5, and a connection 14 which leads to the discharge spout 15. The connecting pipe 14 has a valve 16 operated by its stem 17. A semi-circular member 18 is fixed upon the stem so as to turn therewith, and to which is attached one end of a tension spring 19, the opposite end of the latter being secured to a bracket 20, the object of the spring tension device being to hold the valve in closed position. Both valves, the cylinder and their various connections are contained within a case 21 having a closely fitted cover 22, the latter having stuffing boxes 23 and 24 respectively for the stems 8 and 17 of the corresponding valves. The case has a stuffing box 25 through which the connecting pipe 14 leads to the discharge spout 15.

A pipe casing 26 has connection with the supply tank 1 at the top thereof, and has arranged in line therewith an overflow tank 27, and also one or more of the cases 21, according to the number of discharge appliances required. The casing 26 connects with the case 21 at the bottom thereof and also at the top so as to afford communication between the case and casing. The distributing pipe 5 is contained within the pipe-casing 26 and enters the cases 21. The uppermost end of the pipe casing 26 has fixed thereon a pop-valve 28 adapted for the release of excessive pressure in the pipe-casing. A housing 29 is arranged over the pop-valve and has connection with a vent-pipe 30.

Air under pressure is introduced into the pipe-casing through an air-pipe 31 connected therewith and which leads from a suitable source of supply of air under pressure, the pipe 31 having a valve 32 for controlling the supply. The pipe has also a step-valve 33 of ordinary construction adapted to regulate the amount of air pressure in the pipe-casing. The vent-pipe 30 has a valve 34 and has connection with the air supply pipe 31. The upper end of the vent-pipe has free opening and is intended to extend to the exterior of the building 35 in which the apparatus is installed. The storage tank 3 has a pipe connection 36 at its top with the vent-pipe 30 for the escape of gas or the admission of air.

In the operation of this invention the supply-tank becomes filled with liquid through the siphon from the storage tank, and when air under pressure is introduced into the pipe-casing the consequent pressure on the liquid in the supply-tank causes the liquid to flow from the tank through the distributing pipe from which its discharge is controlled by the discharge-heads. When the supply-tank is thus relieved of its contents of liquid, the supply of air under pressure is shut off and the pressure of air in the pipe-casing and tank is released by opening the valve 34 so that the air in the casing may pass out through the vent-pipe. When the pressure within the tank is thus released the liquid resumes its flow through the siphon and the supply-tank becomes refilled.

By arranging the discharge-heads within the cases and inclosing the distributing pipe within the pipe-casing, and by connecting the pipe-casing with the cases, accidental discharge of liquid about the premises is prevented: should the pipe-casing leak seriously or become broken, the air will exhaust through the break and therefore no liquid will be expelled from the tank out through the distributing pipe; and should any of the discharge-heads leak or become broken so that liquid escapes into the case, the liquid will gravitate from the case through the pipe-casing back to the supply-tank. Thus is obviated a serious danger that ordinarily prevails in distributing inflammable liquids in buildings through pipe systems. Should fire occur within the building and the discharge apparatus become heated so that vapor forms in the distributing pipe, the liquid contents thereof will gravitate back into the supply tank out of danger. In the event the supply tank be already filled, the surplus liquid will rise in the pipe-casing and be received in the overflow tank 27. The overflow tank, being located above the level of both supply and storage tanks, does not become filled during the normal use of the apparatus. But, should the air pressure be released from the pipe casing, and a leak occur in the distributing pipe, air will then be drawn into the latter through the leak by the weight of liquid in the distributing pipe and the liquid will therefore gravitate back into the supply tank. By locating the overflow tank above the other tanks a reserved capacity in the former for the reception of the returning liquid from the distributing pipe is assured.

What I claim and desire to secure by Letters Patent is:—

1. In apparatus of the class described, a supply-tank; a closed case; a discharge head in the case; a pipe casing leading from the top of the supply-tank and having connection with the case; a distributing pipe inclosed by the pipe-casing and communicating with the lower end of the supply-tank and with the discharge head in the case; and means for supplying air under pressure to the pipe-casing.

2. In apparatus of the class described, a supply-tank for liquid; a distributing pipe communicating with the lower part of the supply-tank and having a discharge device in connection therewith; a pipe-casing in connection with the upper part of the supply-tank and inclosing the distributing pipe; an overflow tank above the supply tank and connected in line with the pipe-casing; and means for supplying air under pressure to the pipe-casing.

3. In apparatus of the class described, a supply tank for liquid, a storage tank having connection with the supply tank, the latter being adapted to become charged with liquid by gravital flow from the former; a distributing pipe communicating with the lower part of the supply tank; a pipe-casing in connection with the upper part of the supply tank and inclosing the distributing pipe, the pipe-casing being adapted to direct air under pressure applied thereto into the supply tank; and an overflow tank above said tanks and connected in line with the pipe-casing.

In testimony whereof I affix my signature, in presence of two witnesses.

AUGUSTUS BOWSER.

Witnesses:
 MATHILDA METTLER.
 WALTER G. BURNS.